US012744667B2

(12) United States Patent
Nine et al.

(10) Patent No.: US 12,744,667 B2
(45) Date of Patent: Sep. 22, 2026

(54) PROOF OF MEDIA METADATA INTEGRITY ON HASHGRAPH

(71) Applicants: Jerald Nine, Waco, TX (US); Jonathan Taft, Grandview, MO (US)

(72) Inventors: Jerald Nine, Waco, TX (US); Jonathan Taft, Grandview, MO (US)

(73) Assignee: Image Proof Inc, Austin, TX (US)

( * ) Notice: Subject to any disclaimer, the term of this patent is extended or adjusted under 35 U.S.C. 154(b) by 82 days.

(21) Appl. No.: 19/049,555

(22) Filed: Feb. 10, 2025

(65) Prior Publication Data

US 2025/0279887 A1 Sep. 4, 2025

Related U.S. Application Data

(60) Provisional application No. 63/559,387, filed on Feb. 29, 2024.

(51) Int. Cl.

| | |
|---|---|
| ***H04L 9/32*** | (2006.01) |
| ***H04L 9/00*** | (2022.01) |
| ***H04L 9/08*** | (2006.01) |
| ***H04L 9/14*** | (2006.01) |

(52) U.S. Cl.
CPC .............. *H04L 9/32* (2013.01); *H04L 9/0861* (2013.01); *H04L 9/0894* (2013.01); *H04L 9/14* (2013.01); *H04L 9/50* (2022.05)

(58) Field of Classification Search
CPC ....... H04L 9/32; H04L 9/0861; H04L 9/0894; H04L 9/14; H04L 9/50; H04L 9/3297; H04L 9/3239
See application file for complete search history.

(56) References Cited

U.S. PATENT DOCUMENTS

2024/0161092 A1* 5/2024 Russell .................. G06F 21/16
2026/0128909 A1* 5/2026 Doshi .................. H04L 9/3247

* cited by examiner

*Primary Examiner* — Hany S. Gadalla
(74) *Attorney, Agent, or Firm* — Dunlap Bennett & Ludwig PLLC

(57) ABSTRACT

This invention presents a dual-layer verification system for authenticating digital media using HashGraph distributed ledger technology. By separately hashing and recording metadata on-chain while keeping media hashes off-chain, the system ensures authenticity while allowing controlled disclosure of the media hash. It supports optional metadata embedding within media files, re-hashing for integrity verification, and browser-based trust links for real-time validation. Rather than preventing deepfakes or deceptive content, this technology establishes a trusted repository and verification framework, providing a reliable news feed of authenticated media. This system enhances media integrity for applications in social media, journalism, and forensic investigations.

13 Claims, 2 Drawing Sheets

PROOF OF MEDIA METADATA INTEGRITY ON HASHGRAPH

CROSS-REFERENCE TO RELATED APPLICATION

This application claims the benefit of priority of U.S. provisional application No. 63/559,387, filed Feb. 29, 2024, the contents of which are herein incorporated by reference.

BACKGROUND OF THE INVENTION

In today's digital landscape, verifying the authenticity of digital media content has become increasingly difficult. The rise of deepfakes, AI-generated images, and sophisticated manipulation techniques has made it challenging to distinguish between genuine and altered media. Existing distributed ledger-based verification solutions suffer from two major shortcomings:

1. Privacy Risks—Existing systems directly expose media file hashes on public distributed ledgers, whether blockchain- or DAG-based. This can lead to government censorship, where authorities or ISPs block access to specific media by adding the associated hash to a restricted list, effectively rendering the content inaccessible.
2. Media-of-Media Abuse—Current verification models lack robust metadata validation, making them susceptible to media-of-media attacks—such as taking a photo of a photo or recording a video of a video. These attacks exploit timestamp and location metadata, allowing falsified content to appear legitimate. Traditional hash-based authentication, which relies primarily on limited EXIF data, is inadequate for detecting such manipulations.

SUMMARY OF THE INVENTION

The present invention introduces a novel dual-trust-key architecture that fundamentally reimagines digital media verification by separating metadata authentication from media hash disclosure. This system effectively balances privacy, security, and verifiability through a flexible dual-trust-key framework:

- Trust Key 1: A metadata file hash, which is minted on the Hedera HashGraph, a public distributed ledger, ensuring a tamper-proof record of the media's contextual data without exposing the media file hash itself.
- Trust Key 2: The media file hash, which is embedded within Trust Key 1's metadata file. This key can be selectively disclosed—either kept private or made public—recorded within the HCS (Hedera Consensus Service) message, rather than stored directly on the ledger, allowing privacy control while maintaining cryptographic integrity.

This adaptive design provides unprecedented flexibility, allowing organizations to verify digital media authenticity while safeguarding sensitive data. Unlike conventional blockchain- or DAG based verification systems, which rigidly expose media hashes and lack privacy controls, this approach ensures trust without compromising confidentiality. By enabling selective disclosure and decoupling verification from immutable exposure, it mitigates correlation risks while preserving content integrity.

At a technical level, the system employs a novel trust-link mechanism to enable both real-time and retrospective verification. This mechanism allows for automated cryptographic validation of content authenticity while leveraging the dual-key architecture to enhance privacy. The system utilizes HashGraph's consensus algorithm, ensuring high throughput, rapid finality, and scalability for practical deployment.

By establishing a robust and privacy-preserving verification framework, this invention enables trusted content validation across multiple domains, including journalism, legal documentation, and social media platforms. Through its innovative dual-key design, it ensures strong privacy guarantees while maintaining verifiability, security, and adaptability.

BRIEF DESCRIPTION OF THE DRAWINGS

FIG. 2 details the first part of the authentication process, as outlined in FIG. 1. It covers app usage, image capture, and metadata recording, including time, location, speed, and device information. Additionally, it illustrates the optional embedding of metadata within the image file and the transmission of data to the server for processing.

FIG. 3 presents the second part of the authentication process, completing the steps introduced in FIG. 1. It focuses on:

Figure 1:
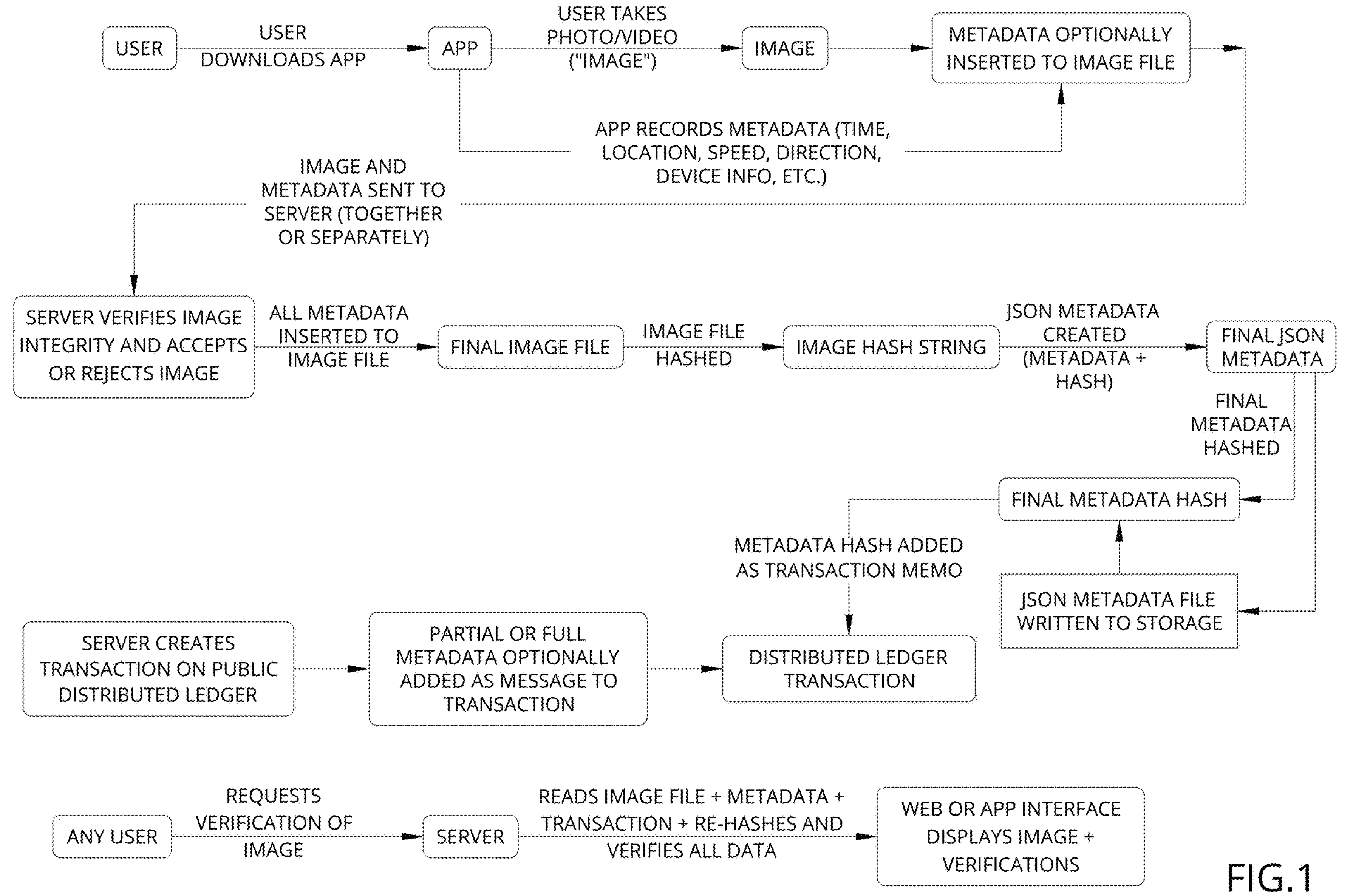
FIG. 1 provides an overview of the entire system and method for authenticating media file metadata on the Hedera HashGraph, a public distributed ledger technology (DLT). This figure illustrates the end-to-end user workflow, from capturing an image or video to verifying its integrity on the ledger, ensuring data immutability and trust.
Figures 2, 3:
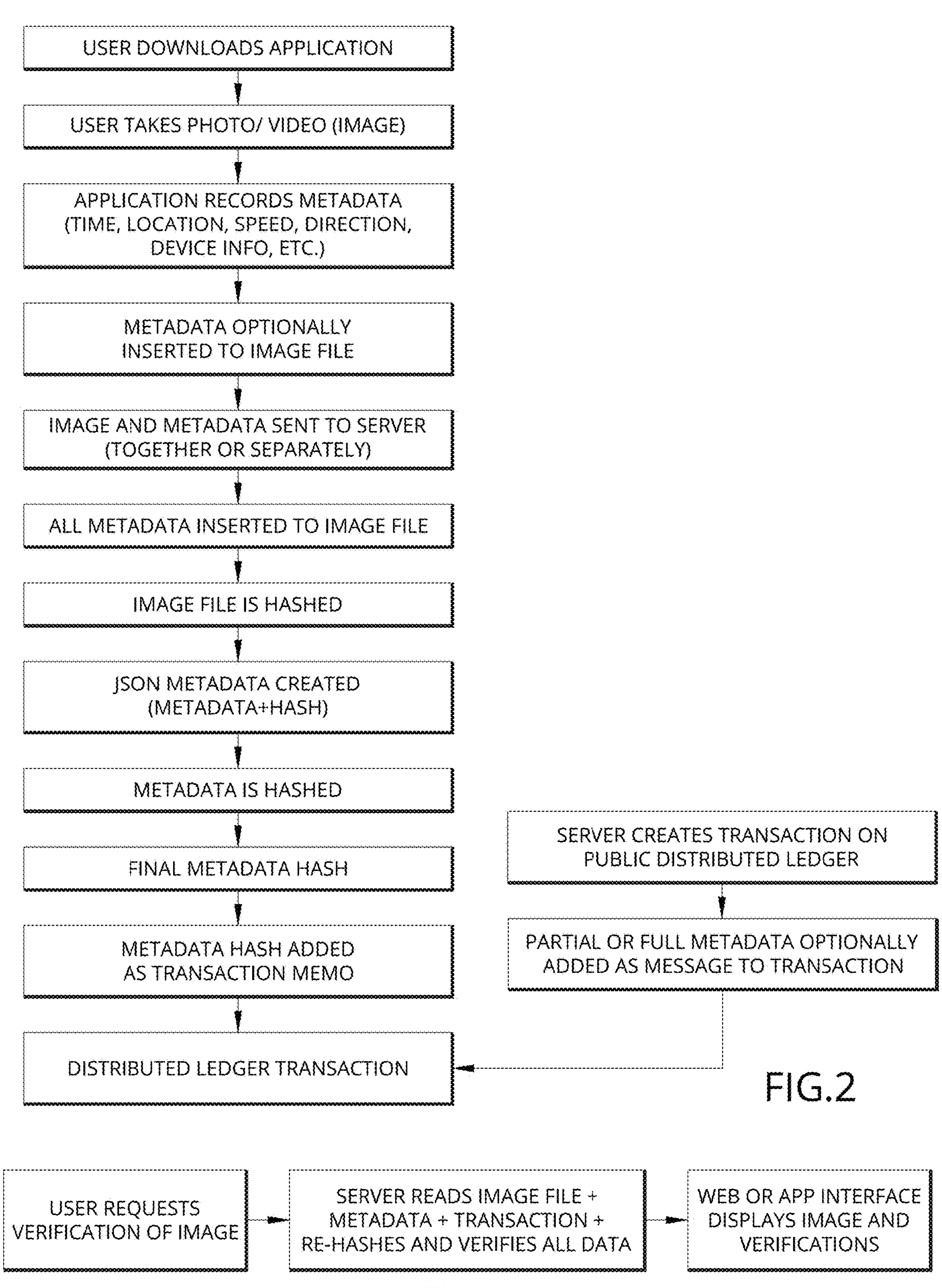

- Hashing of the image file
- Creation and hashing of metadata.
- Integration with the HashGraph distributed ledger via transactions and memos
- Final verification of the image and metadata through a web or app interface.

DETAILED DESCRIPTION OF THE INVENTION

Overview

The present invention introduces a dual-trust-key authentication system for digital media verification, leveraging HashGraph distributed ledger technology. This architecture enables a flexible verification process by cryptographically linking two trust components: Trust Key 1, which secures metadata integrity on the HashGraph, and Trust Key 2, which authenticates the media file while allowing its hash to remain private or, at the user's discretion, be publicly recorded in an HCS message (linked to the ledger but not stored directly on-chain). By decoupling media hash storage from the core ledger transaction, this system ensures robust verification, adaptable privacy controls, and enhanced security without compromising public verifiability.

The implementation specifically leverages Hedera HashGraph's consensus protocol to achieve high throughput and rapid transaction finality. Unlike traditional blockchain or other DAG-based approaches that permanently expose media hashes on-chain, this system's dual-trust-key architecture enables selective disclosure, allowing users to control hash visibility while preserving full verifiability.

System Architecture and Operation

The system implements a dual-trust-key verification framework through the following technical processes:

1. Media Capture and Metadata Collection

The process begins when a user captures media (videos or photos) through a secure application (iOS, Android, Web, Windows, Mac, Linux). Upon capture, the app automatically collects and validates a comprehensive set of metadata, which may include but not limited to:

High-precision temporal data: Timestamp with UTC offset

Geospatial coordinates: Latitude, longitude, and altitude

Device motion vectors: Speed, direction, and acceleration

Hardware specifications: Device model, OS version, and security state

Sensor readings: Compass, gyroscope, and accelerometer

2. Dual-Layer Transmission Protocol

The system supports two distinct methods for transporting media with its associated metadata:

a) Embedded Transmission:

Metadata is embedded within the media file on-device

Ensures an atomic relationship between content and metadata

Preserves original capture parameters for integrity b) Separate/Parallel Transmission:

Media and metadata are transmitted as separate encrypted streams

Maintains cryptographic linkage via secure identifiers

Enables selective metadata privacy controls

Optimized for low-bandwidth or weak cellular coverage

3. Dual-Trust-Key Generation and Ledger Storage

The system establishes its chain of trust through two distinct cryptographic keys:

a) Trust Key 2 (Media Authentication):

Generates cryptographic hash of the complete media file with embedded metadata.

Creates unique digital fingerprint for the specific media instance

Maintains hash security through off-chain storage and selective disclosure b) Trust Key 1 (Metadata Verification):

Creates structured JSON metadata container including:

Media file hash reference (Trust Key 2)

Complete metadata payload

Generates metadata hash (Trust Key 1)

Stores Trust Key 1 on Hedera HashGraph via transaction memo c) Media and Metadata URL Handling & Access Control:

System stores cloud copies of the final media and metadata files.

These copies are linked to URLs recorded in the HCS message using an obfuscated identifier to ensure integrity and ease of verification.

For high-security scenarios, URLs are restricted and inaccessible to the public, ensuring controlled access.

For low-security scenarios, URLs remain openly accessible for ease of verification and transparency.

d) Media Hash Privacy & Selective Disclosure:

The media file hash is publicly recorded in an HCS message by default, linking it to the ledger for verification while keeping it off-chain.

Users can opt to keep the media hash private, ensuring it remains undisclosed while still cryptographically verifiable.

This selective disclosure model decouples media hash storage from the core ledger transaction, providing flexibility without compromising integrity.

By allowing users to control hash visibility, the system balances public verifiability, privacy, and security, adapting to different trust requirements.

4. Dual-Layer Verification Protocol

Users can verify content through two methods:

a) Manual Verification:

Direct comparison of JSON metadata hash against HashGraph transaction

Cryptographic validation of Trust Key 1 and Trust Key 2

Full metadata integrity verification b) Automated Trust Link Verification:

1. Retrieval Phase:

Fetches cloud-stored media file.

Retrieves cloud-stored JSON metadata file containing Trust Key 2

Accesses HashGraph transaction memo with Trust Key 1

2. Metadata Verification:

Re-hashes JSON metadata file

Validates against Trust Key 1 on HashGraph

Confirms metadata integrity

3. Media Authentication:

Re-hashes media file

Compares against Trust Key 2 from verified json metadata file

If matched, it validates the media is authentic as well as the time, date, location, and all other metadata.

5. Access Control and Transparency Layer

The system provides multiple verification interfaces:

Web-based verification portal for media/metadata validation

Mobile application for real-time authentication

API endpoints for programmatic verification

Users can:

Verify temporal and spatial authenticity of media

Detect post-capture modifications

Access immutable HashGraph transaction records.

Generate shareable trust links with configurable privacy controls

Creators can:

Set their media and JSON metadata files to public or private

Delete their media and JSON metadata files, preventing future access while leaving the immutable metadata hash recorded on HashGraph intact.

This implementation ensures robust verification while maintaining privacy through the dual-trust-key architecture and selective hash exposure.

Advantages of the Invention

The present invention offers several key technical advantages over conventional media authentication methods:

1. Dual-Layer Hashing for Comprehensive Authentication

Unlike traditional verification techniques that rely solely on media file hashes, this system provides:

Optional privacy control for the media file hash (Trust Key 2), preventing unnecessary public exposure.

Establishes a reliable chain of trust through the metadata hash (Trust Key 1)

Implements cryptographic separation while maintaining verifiability

Selective disclosure of verification data

2. Immutable Ledger for Public and Legal Trust

By leveraging HashGraph technology:

Achieves efficient processing of thousands of authenticated media files per second Creates permanent, tamper-proof records for evidentiary purposes Enables transparent verification through consensus-based validation Maintains immutable proof of authenticity for legal and journalistic requirements 3. Real-Time Verification to Combat Misinformation The system provides:

Immediate verification of captured photos and videos

Reliable source of truth for digital media authenticity

Effective countermeasures against deepfakes and AI-generated content

Robust detection of manipulated or altered media

4. Scalability for Social Media, Journalism, and Legal Applications

The invention supports multiple domains, including:

Journalism: Embedding trusted images in news reports

Legal and Law Enforcement: Authenticating crime scene photos and video evidence

Social Media Platforms: Ensuring trusted content is prioritized over manipulated media 5. User-Friendly and Accessible Verification can be conducted by any user via:

Web-based verification portal

Mobile application interface

Providing broad accessibility without requiring specialized knowledge

Supporting intuitive trust link sharing and validation

CONCLUSION

The present invention introduces a groundbreaking approach to digital media authentication, combining dual-trust-key cryptographic verification with the Hashgraph distributed ledger to establish an immutable chain of trust. By securing both media files and metadata, this system raises the standard for digital authenticity, ensuring verifiable proof for journalism, legal evidence, and the fight against misinformation on social media.

The system's unique combination of off-chain media hash storage and on-chain metadata verification enables both privacy and transparency, offering a scalable framework that meets the demands of high-volume applications while maintaining legal admissibility standards. Through its user-friendly interfaces and automated trust links, the invention empowers users to capture, verify, and share authenticated digital content with confidence, establishing a new standard for trusted media in an era of increasing digital manipulation.

What is claimed is:

1. A method for verifying the authenticity of digital media through cryptographic validation with 2 trust keys and the Hedera Hashgraph, the method comprising:

Capturing digital media (video or image) and contextual metadata of the digital media via a secure application (IOS, Android, Web, Windows, Mac, Linux) on a capturing device;

Generating a cryptographic hash of the media file (Trust Key 2);

Generating a separate JSON metadata file that includes the contextual metadata of the digital media as well as the media file hash (Trust Key 2);

Generating a cryptographic hash of the JSON metadata file (Trust Key 1);

Storing the JSON metadata file hash (Trust Key 1) on the Hedera Hashgraph distributed ledger via a Hedera Hashgraph distributed ledger transaction (a DAG based DLT);

Verifying media authenticity by matching Trust Key 1 from the ledger with the JSON metadata file hash and Trust Key 2 from the JSON metadata file with the media file hash.

2. The method of claim 1, wherein the only strictly on-chain metadata is the cryptographic hash of the JSON metadata file (Trust Key 1).

3. The method of claim 1, wherein the Hedera Hashgraph distributed ledger transaction has an attached Hedera Consensus Service (HCS) message that includes at least one of the following:

Media ID;

Media file hash (selectively allowed/disallowed by the user);

Media info URL (configurable as public or private);

Media timestamp;

Media file URL (configurable as public or private);

Last distributed ledger block reference;

Last block timestamp;

Metadata file hash;

Metadata file URL (configurable as public or private); and

Software version.

4. The method of claim 1, wherein the JSON metadata file stores off-chain metadata and includes at least one of the following:

Sensor Data:

- Accelerometer readings;
- Raw accelerometer readings;
- Compass accuracy;
- Compass direction;
- Gyroscope readings;
- Heading direction;
- Heading accuracy;
- Magnetometer readings;

Geospatial Data:

- Altitude at the time of capture;
- Altitude accuracy;
- Geographic coordinates (latitude, longitude);
- Location accuracy level;
- Speed at the time of capture;
- Speed accuracy level;

Device Status & Security:

- Battery level at the time of capture;
- Jailbroken status of the capturing device;

Distributed Ledger References:

- Last recorded distributed ledger block reference;
- Last distributed ledger timestamp;

File Identifiers & Links:

- Media ID;
- Media file hash;
- Media info URL (configurable as public or private);
- Media timestamp;
- Media file URL (configurable as public or private);
- Metadata file URL (configurable as public or private);

Device Information:

- Model of the capturing device;
- Platform (IOS, Android, etc.);

Software Information:

- Software name used for capturing;
- Software version number;

User Identifier:

- A unique identifier for the user capturing the media.

5. The method of claim 1, further comprising performing an automated trust link verification process, wherein cloud-stored copies of media files are to be verified against Trust Key 1 and Trust Key 2, the automated trust link verification process comprising:

Generating a media info URL serving as a trust link that displays the media file and JSON metadata for comparison against Trust Key 1 on the Hashgraph; and Displaying a verification status in real-time.

6. The method of claim 5, wherein the automated trust link verification process:

Allows users to scan a trust link QR code to verify a media file's authenticity;

Supports public or private media verification; and

Enables automated periodic re-verification to detect tampering.

7. The method of claim 1, wherein the metadata is embedded directly into the media file before transmission.

8. The method of claim 1, wherein the media file and metadata are transmitted separately to a cloud storage system for further processing.

9. The method of claim 1, wherein the capturing device is checked to determine whether it is jailbroken or rooted.

10. The method of claim 1, wherein the method further comprises verifying against "media of media" fraud by detecting:

Moiré patterns in images or video using ML models;

Light depth inconsistencies using LiDAR sensors; and

Metadata discrepancies in environment-based location verification.

11. The method of claim 1, wherein augmented reality (AR) is used to capture a panoramic scene to mitigate against deception and abuse.

12. The method of claim 1, wherein the verification process supports offline media capture and delayed Hedera Hashgraph distributed ledger recording.

13. The method of claim 1, wherein a digital rewards system incentivizes verified media submissions using tokenized incentives.

* * * * *